(12) United States Patent
Ide

(10) Patent No.: US 12,224,629 B2
(45) Date of Patent: Feb. 11, 2025

(54) CONTROL SYSTEM AND METHOD OF CONTROLLING CONTROL SYSTEM

(71) Applicant: CANON KABUSHIKI KAISHA, Tokyo (JP)

(72) Inventor: Takeshi Ide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 17/856,439

(22) Filed: Jul. 1, 2022

(65) Prior Publication Data

US 2023/0008049 A1 Jan. 12, 2023

(30) Foreign Application Priority Data

Jul. 6, 2021 (JP) .................................. 2021-111928

(51) Int. Cl.
*H02K 11/04* (2016.01)
*H02J 50/20* (2016.01)
*H02K 11/27* (2016.01)

(52) U.S. Cl.
CPC .............. *H02K 11/27* (2016.01); *H02J 50/20* (2016.02); *H02K 11/04* (2013.01)

(58) Field of Classification Search
CPC .......... H02K 11/27; H02K 11/04; H02J 50/20
USPC ....................................................... 307/104
See application file for complete search history.

(56) References Cited

U.S. PATENT DOCUMENTS

| 2013/0026849 | A1* | 1/2013 | Ohta ........................ G06F 1/26 307/104 |
| 2014/0346888 | A1* | 11/2014 | Kim ........................ H04B 5/79 307/104 |
| 2017/0033613 | A1* | 2/2017 | Takahashi ............... H02J 50/12 |
| 2020/0287375 | A1* | 9/2020 | Jha .......................... H02J 50/80 |

FOREIGN PATENT DOCUMENTS

JP 2018-054847 A 4/2018

* cited by examiner

*Primary Examiner* — Michael R. Fin
(74) *Attorney, Agent, or Firm* — Canon U.S.A., Inc. IP Division

(57) ABSTRACT

A control system includes a switch circuit configured to switch an alternating-current voltage, a power transmission antenna configured to wirelessly transmit power based on the alternating-current voltage determined by switching of the switch circuit, a power reception antenna configured to wirelessly receive the power wirelessly transmitted from the power transmission antenna, a rectification circuit configured to rectify a voltage output from the power reception antenna to apply the alternating-current voltage to a load unit, a current detection unit configured to detect an alternating current flowing through the switch circuit, and a control unit configured to control a value of the alternating-current voltage applied to the switch circuit based on a value of the alternating current detected by the current detection unit.

10 Claims, 5 Drawing Sheets

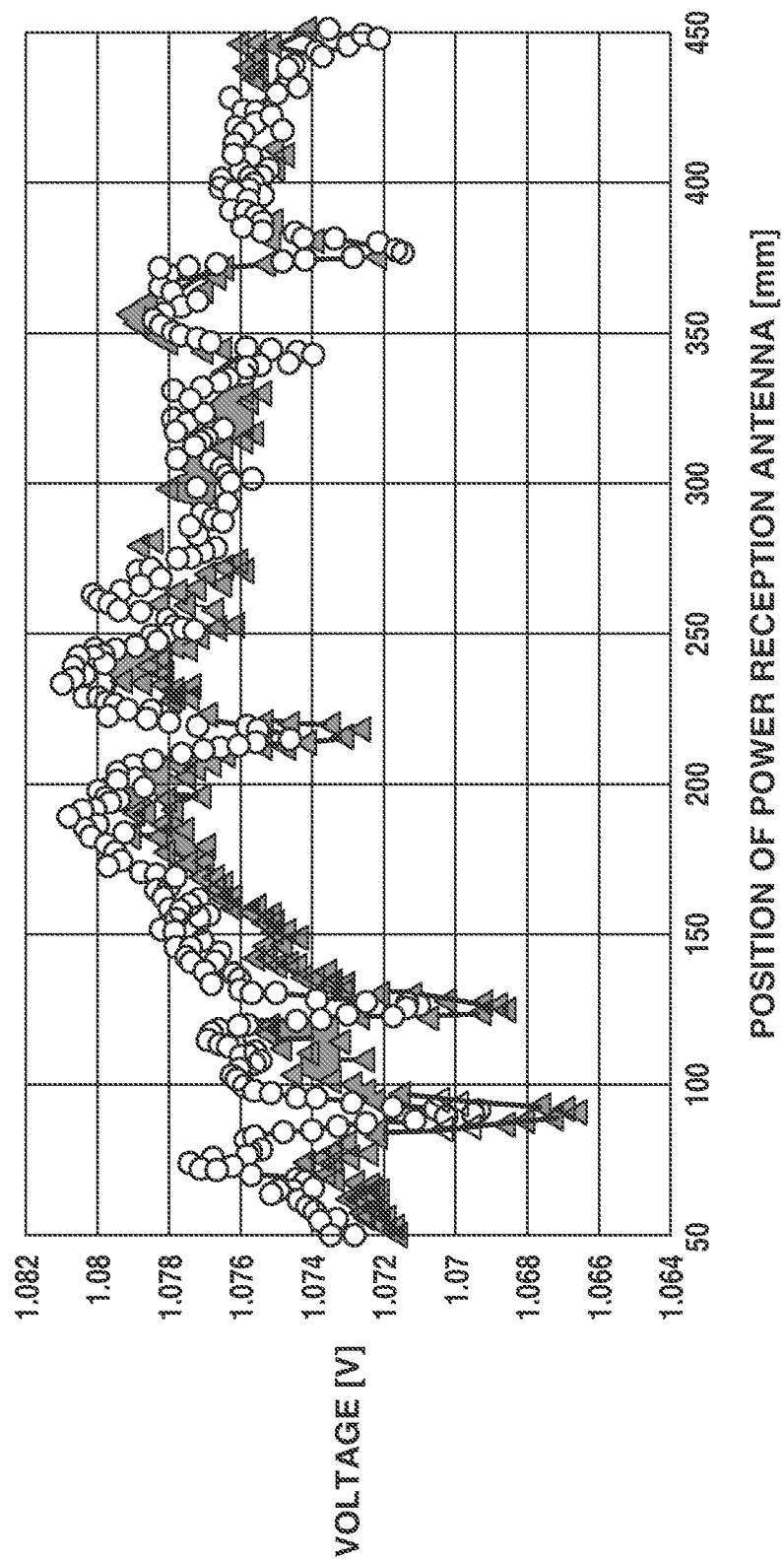

CONTROL SYSTEM AND METHOD OF CONTROLLING CONTROL SYSTEM

BACKGROUND

Field of the Disclosure

The present disclosure relates to a control system and a method of controlling the control system.

Description of the Related Art

There is a system supplying power to a motor to drive the motor. For example, in a semiconductor exposure apparatus, a motor that finely moves a wafer to form a pattern on the wafer is mounted on a stage for moving the wafer to an exposure position, and a power supply cable supplying power for driving the motor is connected to the stage. The cable moves together with a movement of the stage. Thus, tension of the cable influences positioning accuracy of the stage. Thus, wireless transmission of the power for driving the motor has been considered.

Further, in recent years, there has been a demand for controlling a voltage applied to a load unit such as the motor, with high accuracy. For example, in the semiconductor exposure apparatus, to position the stage with high accuracy, there has been a demand for suppressing fluctuation of the voltage applied to the motor to several mV or less.

To suppress the fluctuation of an output voltage, feedback control in which the fluctuation of the output voltage is fed back and an input voltage is controlled to suppress the fluctuation of the output voltage is generally used.

Japanese Patent Application Laid-Open No. 2018-54847 discusses a configuration of a motor wireless driving system that feeds back a wirelessly-received voltage based on power supplied by wireless power transmission, to control a wirelessly-transmitted voltage.

To feed back the wirelessly-received voltage to control the wirelessly-transmitted voltage, it is necessary to wirelessly transmit information on a value of the wirelessly-received voltage to a wireless power transmission apparatus. In the system discussed in Japanese Patent Application Laid-Open No. 2018-54847, the information on the value of the wirelessly-received voltage is wirelessly transmitted to the wireless power transmission apparatus by using wireless communication such as Bluetooth®.

When the wireless communication is used for feedback to the wireless power transmission apparatus, however, communication delay of the wireless communication occurs, and a timing when the wirelessly-transmitted voltage is controlled is accordingly delayed. Therefore, it is not possible to quickly respond to fluctuation of the wirelessly-received voltage. As a result, the fluctuation cannot be suppressed in some cases.

SUMMARY

The present disclosure is directed to a technique that can perform wireless power transmission on a load unit and can control an alternating-current voltage applied to the load unit with high accuracy.

According to an aspect of the present disclosure, a control system includes a switch circuit configured to switch an alternating-current voltage, a power transmission antenna configured to wirelessly transmit power based on the alternating-current voltage determined by switching of the switch circuit, a power reception antenna configured to wirelessly receive the power wirelessly transmitted from the power transmission antenna, a rectification circuit configured to rectify a voltage output from the power reception antenna to apply the alternating-current voltage to a load unit, a current detection unit configured to detect an alternating current flowing through the switch circuit, and a control unit configured to control a value of the alternating-current voltage applied to the switch circuit based on a value of the alternating current detected by the current detection unit.

Further features of various embodiments will become apparent from the following description of exemplary embodiments with reference to the attached drawings.

BRIEF DESCRIPTION OF THE DRAWINGS

FIG. 3 is a diagram illustrating an example of a relationship between an output voltage and a position of a power reception antenna.

DESCRIPTION OF THE EMBODIMENTS

Figure 1:
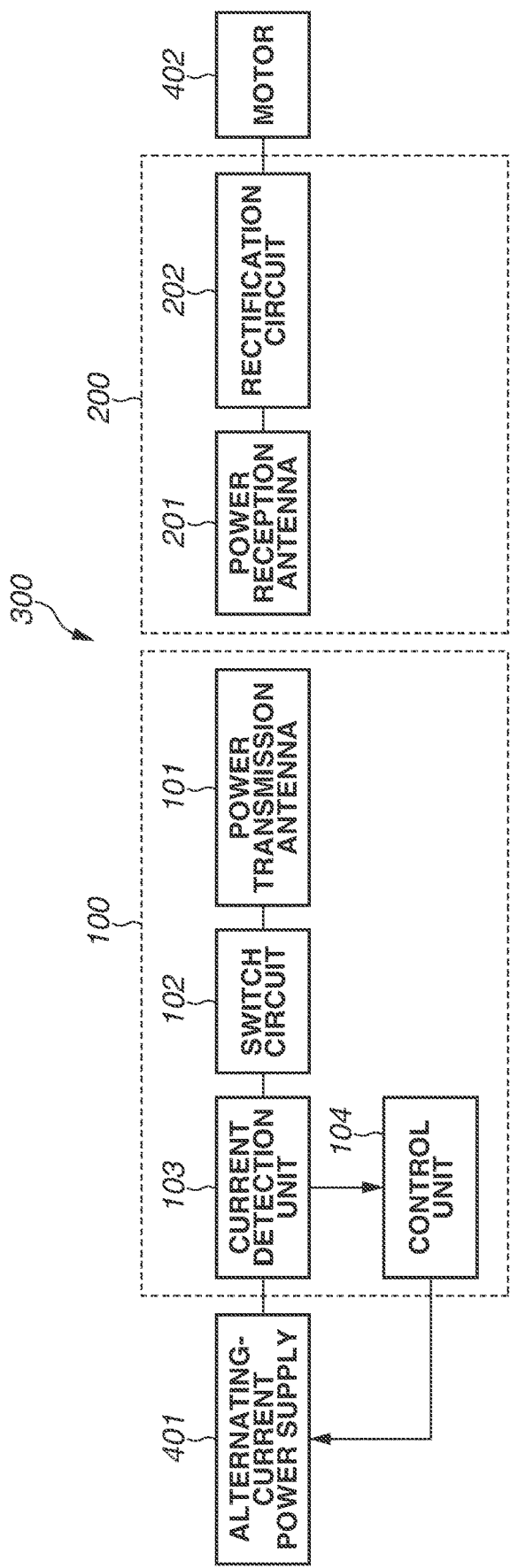
FIG. 1 is a block diagram illustrating a configuration example of a control system.

Exemplary embodiments are described in detail below with reference to the drawings. The following exemplary embodiments are not intended to limit the claims. While a plurality of characteristics is described in the exemplary embodiments, not all of the plurality of characteristics is necessarily essential, and the plurality of characteristics may be freely combined. Further, in the drawings, the same or similar components are denoted by the same reference numerals, and repetitive descriptions thereof are omitted.

[System Configuration]

FIG. 1 is a block diagram illustrating a configuration example of a control system 300 according to a first exemplary embodiment.

The control system 300 includes a power transmission unit 100, a power reception unit 200, an alternating-current power supply 401, and a motor 402. The power transmission unit 100 and the power reception unit 200 are not physically connected. Power is transmitted from a power transmission antenna 101 to a power reception antenna 201 in a contactless manner. The power transmission antenna 101 and the power reception antenna 201 are coupled by magnetic field coupling. However, the antennas may be coupled by electric field coupling, or an electromagnetic field coupling.

The control system 300 is, for example, a semiconductor exposure apparatus. A motor 402 is mounted on a stage for moving a wafer to an exposure position. The motor 402 finely moves the wafer to form a pattern on the wafer.

The power transmission unit 100 includes the power transmission antenna 101, a switch circuit 102, a current detection unit 103, and a control unit 104. The control unit 104 detects a current supplied from the alternating-current power supply 401, and feeds back a current detection result to the alternating-current power supply 401. The alternating-current power supply 401 supplies an alternating-current voltage to the switch circuit 102 based on the current detection result. The switch circuit 102 switches the alternating-current voltage supplied from the alternating-current power supply 401 with a frequency higher than a frequency of the alternating-current voltage supplied from the alternating-current power supply 401, and outputs the switched voltage to the power transmission antenna 101. The power transmission antenna 101 wirelessly transmits power to the power reception antenna 201 through magnetic field coupling.

The power reception unit 200 includes the power reception antenna 201 and a rectification circuit 202. The power reception antenna 201 wirelessly receives the power wirelessly transmitted from the power transmission antenna 101. The rectification circuit 202 rectifies the power wirelessly received by the power reception antenna 201, and restores a waveform of the alternating-current voltage supplied by the alternating-current power supply 401. The switch circuit 102, the power transmission antenna 101, the power reception antenna 201, and the rectification circuit 202 form a resonance circuit to efficiently perform wireless power transmission.

The motor 402 is driven based on the alternating-current voltage restored by the rectification circuit 202, and moves the wafer and the like.

Figure 2:
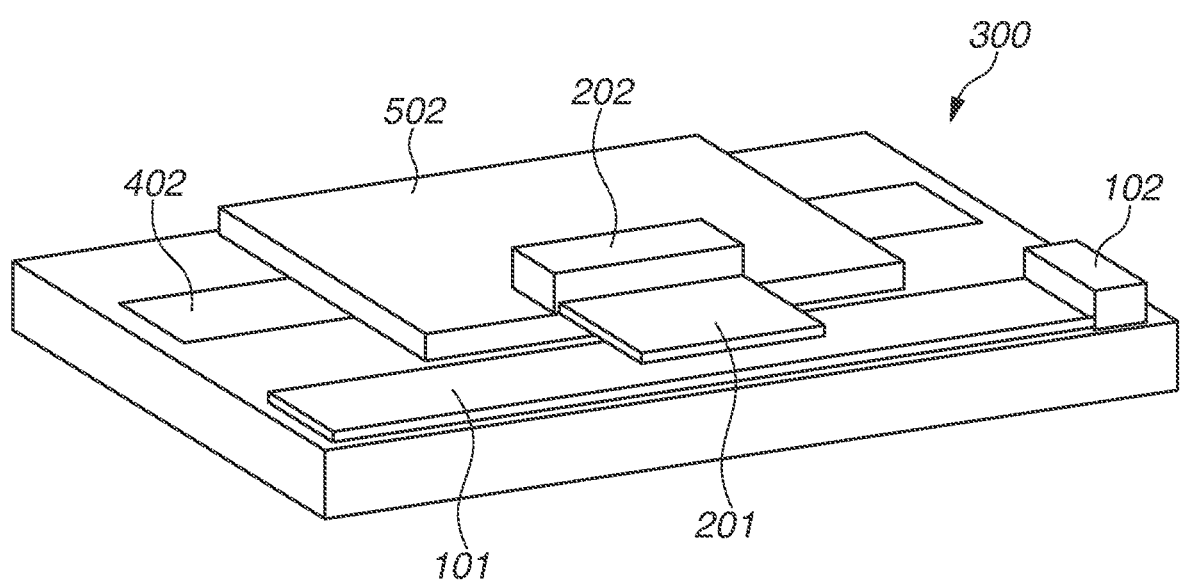
FIG. 2 is a perspective view illustrating an appearance example of the control system.

FIG. 2 is a perspective view illustrating an appearance example of the control system 300 according to the first exemplary embodiment. The control system 300 includes the power transmission antenna 101, the switch circuit 102, the power reception antenna 201, the rectification circuit 202, the motor 402, and a stage 502.

The power reception antenna 201 and the rectification circuit 202 are mounted on the stage 502. The motor 402 is a linear motor and moves the stage 502. Positions of the power transmission antenna 101, the switch circuit 102, and the motor 402 are fixed. The power reception antenna 201 is movable relative to the power transmission antenna 101. The power transmission antenna 101 has a length longer than a length of the power reception antenna 201. The power transmission antenna 101 and the power reception antenna 201 face each other in a contactless manner while the stage 502 moves to any position. Accordingly, while the stage 502 is located at any position, the power reception antenna 201 can wirelessly receive the power from the power transmission antenna 101.

The control unit 104 outputs an instruction value of an output value of the alternating-current voltage to the alternating-current power supply 401. For example, the control unit 104 calculates the instruction value of the output value of the alternating-current voltage based on the current detected by the current detection unit 103, and outputs the instruction value of the output value of the alternating-current voltage to the alternating-current power supply 401. The control unit 104 can calculate the instruction value of the output value of the alternating-current voltage based on positional information on the stage 502 or a predetermined instruction sequence in addition to the current detected by the current detection unit 103. The positional information on the stage 502 is described in detail in a second exemplary embodiment.

The current detection unit 103 detects an instantaneous value of an alternating current flowing from the alternating-current power supply 401 to the switch circuit 102, and outputs the instantaneous value of the alternating current to the control unit 104. The control unit 104 varies the output value of the alternating-current voltage of the alternating-current power supply 401 based on the instantaneous value of the alternating current. In a case where the detected instantaneous value of the alternating current is less than a desired current value, the control unit 104 increases the output value of the alternating-current voltage of the alternating-current power supply 401. In a case where the detected instantaneous value of the alternating current s greater than the desired current value, the control unit 104 reduces the output value of the alternating-current voltage of the alternating-current power supply 401.

[Waveform of Motor Driving Voltage Wirelessly Transmitted]

Before the desired current value is described in detail, the alternating-current voltage for driving the motor 402 is described. To rotate the motor 402 in a forward rotation direction or a reverse rotation direction, it is necessary to change the voltage applied to the motor 402 to a positive voltage or a negative voltage. In other words, application of the alternating-current voltage to the motor 402 makes it possible to control a rotation direction of the motor 402.

In the system discussed in Japanese Patent Application Laid-Open No. 2018-54847, the alternating-current voltage to control the rotation direction of the motor 402 is generated by the power reception unit 200, and a direct-current voltage is applied from a direct-current power supply to the power transmission unit 100. The power transmission unit 100 supplies the direct-current voltage to the power reception unit 200 by wireless power transmission, and the direct-current voltage is supplied to a motor driver in the power reception unit 200. Further, the motor driver generates the alternating-current voltage to control the rotation direction of the motor 402. The feedback control is performed such that a value of the direct-current voltage supplied to the motor driver is maintained at a constant value against fluctuation caused by variation in a load current, external noise, or the like.

Unlike the configuration of the system discussed in Japanese Patent Application Laid-Open No. 2018-54847, in the control system 300 according to the present exemplary embodiment, no motor driver is provided in the power reception unit 200, and the power reception unit 200 has a small size. The alternating-current power supply 401 corresponds to the motor driver. The alternating-current power supply 401 applies the alternating-current voltage to control the rotation direction of the motor 402, to the power transmission unit 100. The power transmission unit 100 supplies power based on the alternating-current voltage to the power reception unit 200 by the wireless power transmission. The power reception unit 200 restores the alternating-current voltage of the alternating-current power supply 401 based on the received power, and applies the restored alternating-current voltage to the motor 402. Thus, the current detected by the current detection unit 103 for feedback control is the alternating current, and the voltage controlled by the alternating-current power supply 401 is the alternating-current voltage.

[Desired Current Value]

Next, the above-described desired current value is described. The desired current value or voltage value described here means a current value or voltage value necessary to implement a function. For example, in the semiconductor exposure apparatus, the desired current value or voltage value indicates a current value or voltage value to be applied to the motor 402 in order to move the stage 502 to a position necessary for formation of a pattern on the wafer.

In a case where the feedback control is performed to maintain the constant direct-current voltage value supplied to the power reception unit 200 as in Japanese Patent Application Laid-Open No. 2018-54847, a desired voltage value is an invariable constant value because of direct current. Thus, a difference between the desired direct-current voltage value and the direct-current voltage value actually supplied is determined, and the direct-current voltage value of the power transmission unit 100 is varied so as to reduce the difference. Under such control, the direct-current voltage value supplied to the power reception unit 200 is maintained at the desired direct-current voltage value.

In contrast, since the power transmission unit 100 according to the present exemplary embodiment supplies the alternating-current voltage to the power reception unit 200 by the wireless power transmission, the desired voltage value is not a constant value and is varied with time. For example, it is necessary for the motor 402 that positions the stage 502 of the semiconductor exposure apparatus to move the stage 502 to various positions with time. Thus, it is necessary to apply the voltage of various values including a positive voltage or a negative voltage. In a case where a control period is 10 kHz, the desired voltage value is varied to a value including a positive voltage and a negative voltage, and is varied every 100 µs. To control the position of the stage 502 with high accuracy, it is necessary to accurately apply the voltage value to the motor 402 every 100 µs. Thus, it is necessary for the control unit 104 to perform the feedback control every 100 µs.

[Fluctuation Factor]

The alternating-current voltage supplied to the power reception unit 200 by the wireless power transmission is fluctuated by an external factor. For example, when the power transmission unit 100 or the power reception unit 200 receives electromagnetic noise generated from another motor or the like inside the apparatus, the alternating-current voltage supplied to the power reception unit 200 is fluctuated.

Since the power reception unit 200 moves together with the stage 502, an electromagnetic environment around the power transmission antenna 101 and the power reception antenna 201 is changed depending on the position of the stage 502, and the alternating-current voltage supplied to the power reception unit 200 by the wireless power transmission is accordingly fluctuated. In particular, intensity of the electromagnetic field to which the power reception antenna 201 is subjected is different between a case where the power reception antenna 201 moves to an end part of the power transmission antenna 101 and a case where the power reception antenna 201 moves to a center part of the power transmission antenna 101, which fluctuates the alternating-current voltage supplied to the power reception unit 200.

Further, when the stage 502 moves, acceleration is applied. Thus, physical distortion occurs in the stage 502, and a distance between the power transmission antenna 101 and the power reception antenna 201 changes. The distance relates to a coupling coefficient between the power transmission antenna 101 and the power reception antenna 201, and the coupling coefficient largely influences transmission efficiency of the wireless power transmission. Thus, when acceleration is applied to the stage 502, the coupling coefficient changes, and the alternating-current voltage supplied to the power reception unit 200 by the wireless power transmission is fluctuated.

[Feedback Control]

To suppress such fluctuations and to apply an accurate voltage to the motor 402 every 100 µs, it is necessary to complete the feedback control within 100 µs. More specifically, the control system 300 detects the instantaneous value of the alternating-current voltage supplied to the power reception unit 200, wirelessly transmits the instantaneous value of the alternating-current voltage to the power transmission unit 100, compares the instantaneous value with the desired voltage value, and calculates a difference generated by fluctuation caused by an external factor. Then, the control system 300 controls the output value of the alternating-current voltage of the alternating-current power supply 401 based on the difference. Further, it is necessary for the control system 300 to continue the operation without delay for subsequent 100 µs and after.

In a case where the instantaneous value of the alternating-current voltage being supplied to the power reception unit 200 is transmitted from the power reception unit 200 to the power transmission unit 100 by the wireless communication as in the system discussed in Japanese Patent Application Laid-Open No. 2018-54847, if the wireless communication is delayed by 100 µs, the feedback control cannot be performed within 100 µs. A time for packet processing or for processing of error correction depending on a radio wave environment is necessary for the wireless communication. The delay by the processing time is generally 1 ms or more, and thus the feedback control using the wireless communication cannot be performed on high-speed control, for example, at 10 kHz. Thus, the feedback control is delayed, and it is not possible to quickly respond to fluctuation of the alternating-current voltage supplied to the power reception unit 200. As a result, the fluctuation cannot be suppressed in some cases.

The control unit 104 according to the present exemplary embodiment feeds back the alternating current detected by the current detection unit 103 provided in the power transmission unit 100 to the alternating-current power supply 401, and controls the output value of the alternating-current voltage of the alternating-current power supply 401. In this configuration, the feedback control is closed only in the power transmission unit 100. Thus, it is unnecessary to use the wireless communication from the power reception unit 200, and delay in control caused by the above-described delay does not occur. Accordingly, the feedback control can be performed at high speed, and the voltage applied to the motor (load unit) 402 can be controlled with high accuracy based on power supplied by the wireless power transmission.

A principle in which the control unit 104 performs the feedback control on the output value of the alternating-current voltage of the alternating-current power supply 401 based on the alternating current of the power transmission unit 100 to suppress the fluctuation of the voltage applied to the motor 402 is described. Briefly, the motor can be regarded as a fixed inductor. Thus, a relationship between the voltage applied to the motor 402 and the current is uniquely determined, and the voltage value can be estimated from the current value. Thus, when the alternating current of the power transmission unit 100 correlated with the current flowing through the motor 402 is known, the voltage applied to the motor 402 is known, and thus how to vary the output value of the alternating-current voltage of the alternating-current power supply 401 is known.

More specifically, to enable the control unit 104 to perform the feedback control on the output value of the alternating-current voltage of the alternating-current power supply 401 based on the alternating current of the power transmission unit 100, it is necessary to derive a relational expression between the voltage applied to the motor 402 and the alternating current of the power transmission unit 100. To vary the voltage value applied to the motor 402 to the desired voltage value, the control unit 104 calculates a target value of the alternating current, namely, the desired current value, based on the relational expression and calculates a difference between the desired current value and the instantaneous value of the current alternating current. Further, the control unit 104 varies the output value of the alternating-current voltage of the alternating-current power supply 401 so as to bring the difference close to zero.

In a case where a routine operation of the stage 502 is repeated in the semiconductor exposure apparatus or the like, a desired waveform of the voltage to be applied to the motor 402 is known. Thus, the desired current value of the alternating current of the power transmission unit 100 may be determined by preliminary measurement. More specifically, the desired current value is determined by applying the voltage in a sequence of actually driving the motor 402 while the stage 502 is stopped, and measuring the alternating current of the power transmission unit 100 at that time. Then, in actual operation, the control unit 104 varies the output value of the alternating-current voltage of the alternating-current power supply 401 by a difference between the instantaneous value of the current alternating current and the desired current value due to the above-described fluctuation factor.

To determine a variation amount of the output value of the alternating-current voltage of the alternating-current power supply 401, a relationship between the output value of the alternating-current voltage and a variation amount of the alternating current may be determined by preliminary measurement.

Since it is necessary for the current detection unit 103 to detect the alternating current, the current detection unit 103 desirably includes a differential input detection circuit that can detect a negative voltage. In a case where the current detection unit 103 measures the current value by using a shunt resistance, an input-output isolation detection circuit may be used because a common mode voltage is high in a motor driving circuit or the like.

As described above, the alternating-current power supply 401 applies the alternating-current voltage to the switch circuit 102 under the control of the control unit 104. The switch circuit 102 switches the alternating-current voltage. The power transmission antenna 101 wirelessly transmits power based on the alternating-current voltage switched by the switch circuit 102. The power reception antenna 201 wirelessly receives the power wirelessly transmitted from the power transmission antenna 101. The rectification circuit 202 rectifies the voltage output from the power reception antenna 201, and applies the alternating-current voltage to the motor 402. The motor 402 is an example of the load unit.

The current detection unit 103 detects the alternating current flowing through the switch circuit 102. The control unit 104 controls a value of the alternating-current voltage applied to the switch circuit 102 via the alternating-current power supply 401 based on the current value detected by the current detection unit 103. More specifically, the control unit 104 controls the value of the alternating-current voltage applied to the switch circuit 102 via the alternating-current power supply 401 based on the difference between the current value detected by the current detection unit 103 and the target value. At least one of the power transmission antenna 101 and the power reception antenna 201 is movable. The above-described target value is a target value based on the movement sequence.

According to the present exemplary embodiment, the control system 300 supplies power from the power transmission antenna 101 to the power reception antenna 201 by the wireless power transmission. The control unit 104 can control the voltage applied to the motor 402 with high accuracy. The control system 300 can perform the wireless power transmission on the motor 402, and can control the alternating-current voltage applied to the motor 402 with high accuracy.

Next, a control system 300 according to a second exemplary embodiment is described. Hereinafter, a difference between the second exemplary embodiment and the first exemplary embodiment will be described. In the control system 300 according to the second exemplary embodiment, feedforward control of the alternating-current power supply 401 based on the positional information on the stage 502 is added to the control system 300 illustrated in FIG. 1. The control system 300 suppresses part of the fluctuation by the feedforward control. As a result, a fluctuation amount to be suppressed by the feedback control is reduced, and the motor 402 can be controlled with higher accuracy.

Next, a fluctuation factor suppressed by addition of the feedforward control based on the positional information is described. In FIG. 2, the stage 502 reciprocates on one axis by the motor 402, and the power reception antenna 201 reciprocates above the power transmission antenna 101 along with the reciprocation of the stage 502.

FIG. 3 is a diagram illustrating an example of a measurement result of the voltage value output from the rectification circuit 202 of the power reception unit 200 by the wireless power transmission, relative to a position of the power reception antenna 201. To check the fluctuation amount of the output voltage with respect to the position of the power reception antenna 201 separately from influence by vibration and the like during the reciprocation of the stage 502, the output voltage is measured in a state where the power reception antenna 201 is moved by 1 mm and is then stopped. The output voltage of the alternating-current power supply 401 is fixed to the direct-current voltage of 1 V, and an output node of the rectification circuit 202 is connected to a resistance load of 10Ω. A length of the power transmission antenna 101 is 600 mm, a length of the power reception antenna 201 is 100 mm, and a movable stroke of the power reception antenna 201 is 500 mm. The measurement results in FIG. 3 are results for the positions of the power reception antenna 201 between 50 mm and 450 mm. Two types of plots, namely, white circles and black triangles, indicate results measured twice under the same condition.

It is found from the results in FIG. 3 that an average of output voltages of the rectification circuit 202 is 1.076 V. It is found that the output voltages of the rectification circuit 202 is fluctuated by about 14 mV (1.3%) relative to the average (1.076 V) depending on the position of the power reception antenna 201. Factors of the fluctuation include manufacturing variation of a material (permittivity, dielectric loss tangent, permeability, etc.) and a shape (substrate thickness, conductor thickness, resist thickness, etc.) with respect to the position of the power transmission antenna 101, and fluctuation of the distance between the power transmission antenna 101 and the power reception antenna 201 caused by mechanical tolerance of the motor 402. It is difficult to completely eliminate the fluctuation.

With regard to the two types of plots, a difference between the two measurement results is 4 mV (0.4%) at a maximum, and the fluctuation of the output voltage in the wireless power transmission with respect to the position of the power reception antenna 201 has reproducibility. Thus, the feedforward control in which the fluctuation amount is preliminarily measured as in FIG. 3, and the motor 402 is controlled by considering the fluctuation amount as a correction value is performable.

The feedforward control is described in detail. The control unit 104 calculates an instruction value to move the stage 502 to a next position based on the current positional information on the stage 502 and the like. Then, the control unit 104 transmits the instruction value to the alternating-current power supply 401. The alternating-current power supply 401 varies the output value of the alternating-current voltage to be output based on the instruction value. As an example, a case is considered where a certain constant voltage value is continuously applied to the motor 402 while the motor 402 moves the power reception antenna 201 on the stage 502 from a position of 100 mm to a position of 400 mm illustrated in FIG. 3. In a case where the output voltage is not fluctuated with respect to the position of the power reception antenna 201, the control unit 104 transmits the certain constant voltage value as the instruction value to the alternating-current power supply 401. Further, the alternating-current power supply 401 outputs the voltage based on the instruction value while the stage 502 is moved from the position of 100 mm to the position of 400 mm.

In a case where the output voltage is fluctuated with respect to the position of the power reception antenna 201 as illustrated in FIG. 3, however, the voltage applied to the motor 402 is fluctuated even when the alternating-current power supply 401 continuously outputs the constant voltage. Thus, the fluctuation amount of the output voltage while the power reception antenna 201 is moved from the position of 100 mm to the position of 400 mm is preliminarily measured and is stored in the control unit 104 in advance as base data. Then, the control unit 104 corrects the instruction value transmitted to the alternating-current power supply 401.

More specifically, the control unit 104 adds a correction value to correct the fluctuation amount in FIG. 3 and make the voltage constant, to an original instruction value. When the control unit 104 performs such feedforward control, the alternating-current power supply 401 outputs a voltage fluctuated in a direction opposite to a fluctuation direction in FIG. 3 to offset the fluctuation amount while the power reception antenna 201 is moved from the position of 100 mm to the position of 400 mm. As a result, the control unit 104 can continuously apply the constant voltage value to the motor 402.

Further, as described in the first exemplary embodiment, fluctuation caused by vibration of the stage 502 and the like is added. Thus, the control unit 104 also performs the feedback control on the output of the alternating-current voltage of the alternating-current power supply 401 based on the fluctuation of the alternating current detected by the current detection unit 103. More specifically, the control unit 104 further adds a correction value to the instruction value based on the instantaneous value of the alternating current detected by the current detection unit 103.

Figure 4A:
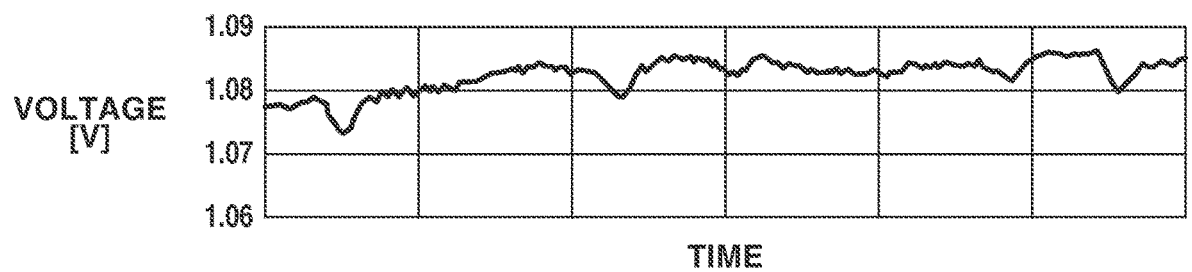
FIGS. 4A to 4D are diagrams each illustrating an example of a waveform of a voltage applied to a motor.

FIGS. 4A to 4D are diagrams each illustrating a voltage waveform for description of the above-described correction. A horizontal axis indicates the time, and a vertical axis indicates the voltage value applied to the motor 402. FIG. 4A illustrates a time waveform of the voltage applied to the motor 402 in a case where the above-described feedback control and the above-described feedforward control are not performed and the power reception antenna 201 on the stage 502 is moved from the position of 100 mm to the position of 400 mm. In FIG. 4A, the fluctuation of the output voltage caused by vibration of the stage 502 is simulatively added as a primary curve relative to the fluctuation of the output voltage depending on the position of the power reception antenna 201 illustrated in FIG. 3.

Figure 4B:
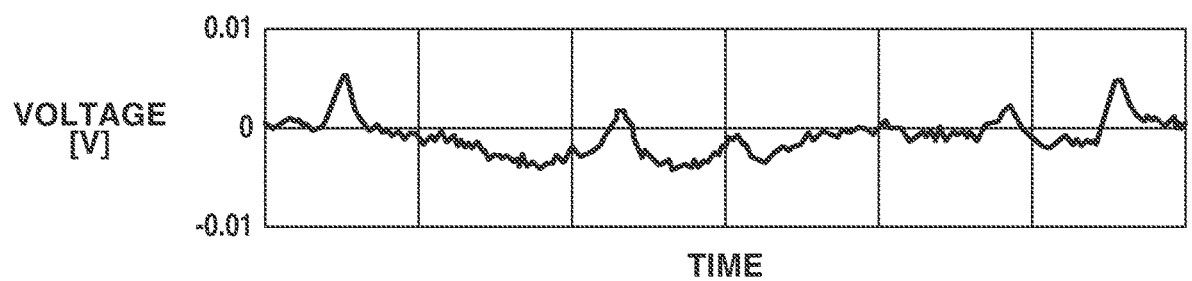

FIG. 4B is a diagram illustrating a voltage waveform of the correction value of the above-described feedforward control.

FIG. 4B illustrates, as the correction value, a preliminarily-measured result of the fluctuation of the output voltage when the power reception antenna 201 on the stage 502 is moved from the position of 100 mm to the position of 400 mm.

Figure 4C:
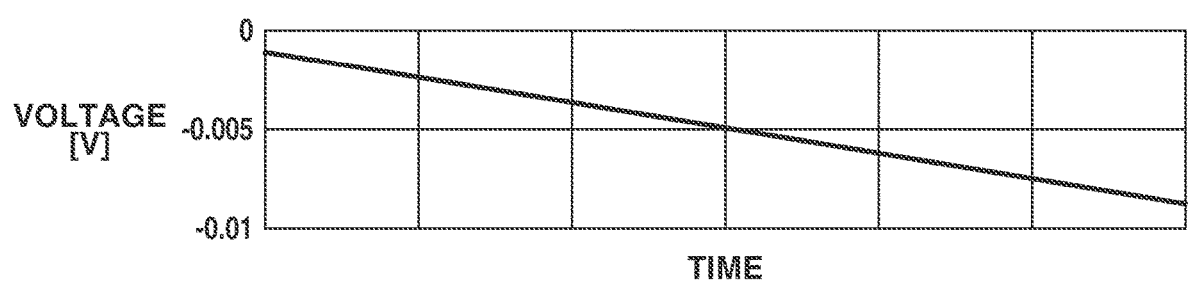

FIG. 4C is a diagram illustrating a voltage waveform of the correction value of the above-described feedback control. The control unit 104 calculates the correction value in FIG. 4C from the difference between the instantaneous value of the alternating current detected by the current detection unit 103 and the preliminarily-measured desired current value.

Figure 4D:
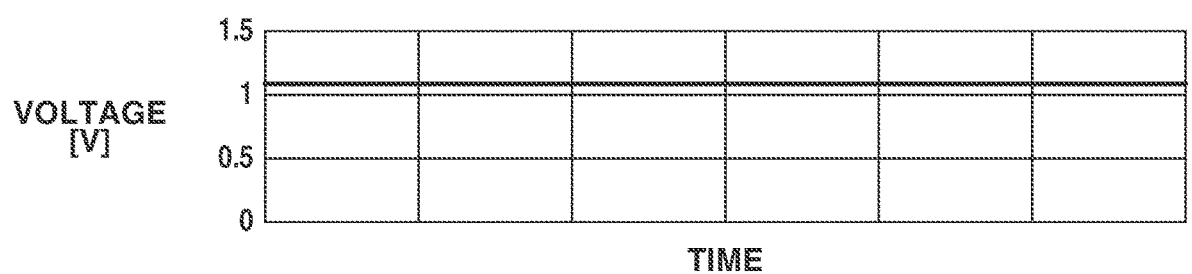

FIG. 4D is a diagram illustrating a time waveform of the voltage applied to the motor 402 in a case where the correction is performed with the correction value of the feedforward control in FIG. 4B and the correction value of the feedback control in FIG. 4C. The voltage in FIG. 4D is obtained by subtracting the voltage in FIG. 4B from the voltage in FIG. 4A and adding the voltage in FIG. 4C to the voltage in FIG. 4A. The control unit 104 performs the correction on the instruction value based on the correction value of the feedforward control in FIG. 4B and the correction value of the feedback control in FIG. 4C, which makes it possible to continuously apply the desired constant voltage as illustrated in FIG. 4D, to the motor 402.

The case where the constant voltage value is continuously applied to the motor 402 has been described fir a simplification purpose of the description; however, the correction is performed in a similar manner in a case where the voltage is not the constant voltage value and is the alternating-current voltage having various values, including a negative voltage. Further, the correction value for the feedforward control by the preliminary measurement is obtained by measuring the output voltage while the power reception antenna 201 is stopped at each position; however, the preliminary measurement may be performed while the power reception antenna 201 is moved by the actual operation sequence of the stage 502. As a result, the correction value including influence by not only the fluctuation of the output voltage depending on the position of the power reception antenna 201 but also vibration caused by the operation of the stage 502 can be made, which makes it possible to reduce a correction amount in the feedback control and to control the motor 402 with higher accuracy.

As described above, the control unit 104 combines the feedforward control correcting the fluctuation of the output voltage depending on the position of the power reception antenna 201 with the feedback control using the alternating current detected by the current detection unit 103 described in the first exemplary embodiment. As a result, the control unit 104 can control the voltage applied to the motor (load unit) 402 with high accuracy based on power supplied by the wireless power transmission.

At least one of the power transmission antenna 101 and the power reception antenna 201 is movable. The control unit 104 controls the alternating-current voltage value applied to the switch circuit 102 based on the correction value corresponding to the relative position of the power reception antenna 201 to the power transmission antenna 101 in FIG. 4B and the correction value corresponding to the current value detected by the current detection unit 103 in FIG. 4C.

According to the present exemplary embodiment, the control unit 104 can control the alternating-current voltage applied to the motor 402 with high accuracy by the feedforward control and the feedback control.

Next, a control system 300 according to a third exemplary embodiment is described. Hereinafter, a difference between the third exemplary embodiment and each of the first and second exemplary embodiments is described.

Figure 5:
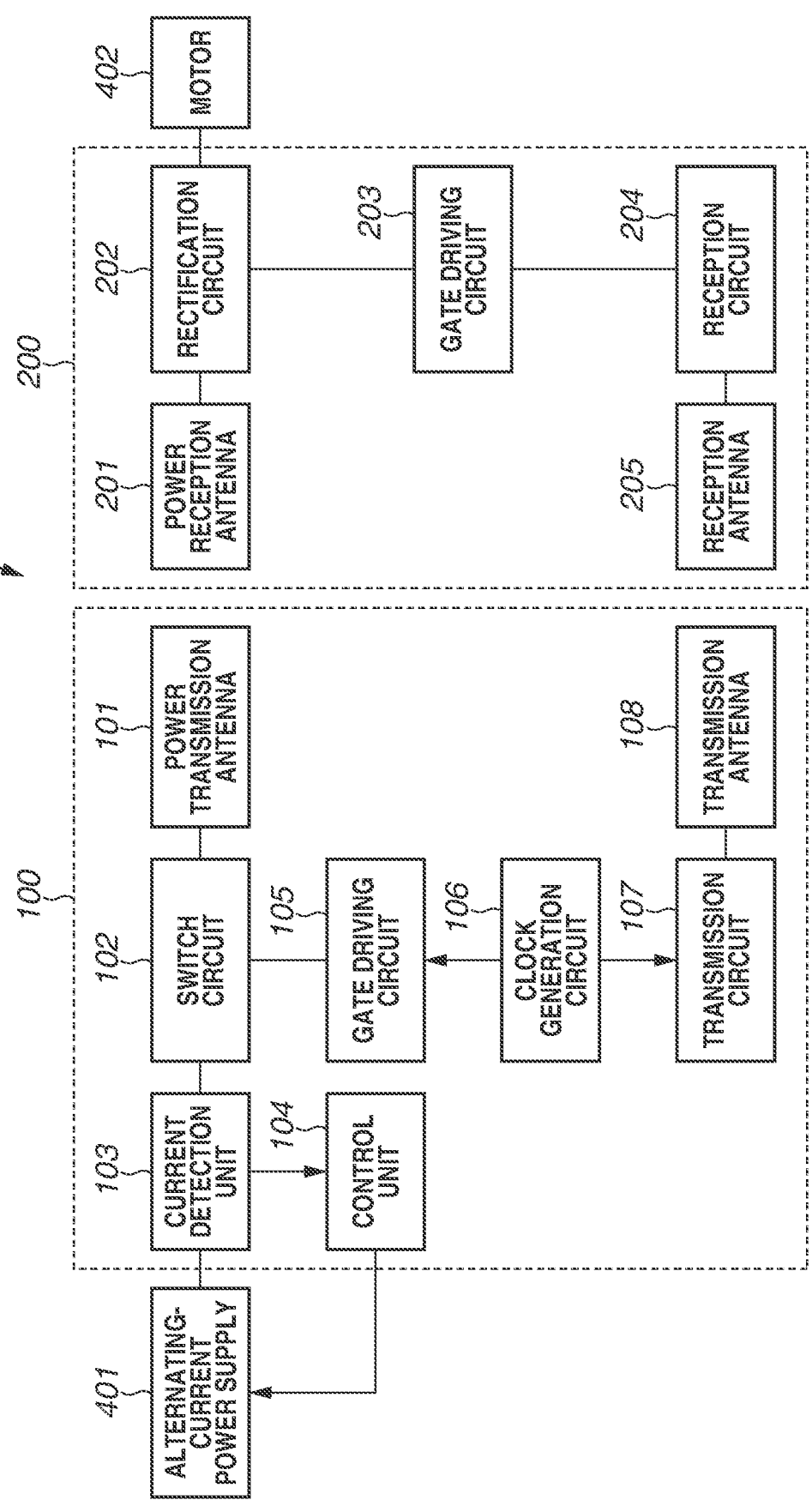
FIG. 5 is a block diagram illustrating a configuration example of a control system.

FIG. 5 is a block diagram illustrating a configuration example of the control system 300 according to the third exemplary embodiment.

The control system 300 in FIG. 5 includes a gate driving circuit 105, a clock generation circuit 106, a transmission circuit 107, a transmission antenna 108, a gate driving circuit 203, a reception circuit 204, and a reception antenna 205 added to the control system 300 in FIG. 1.

A power transmission unit 100 includes the power transmission antenna 101, the switch circuit 102, the current detection unit 103, the control unit 104, the gate driving circuit 105, the clock generation circuit 106, the transmission circuit 107, and the transmission antenna 108. A power reception unit 200 includes the power reception antenna 201, the rectification circuit 202, the gate driving circuit 203, the reception circuit 204, and the reception antenna 205.

The clock generation circuit 106 generates a clock signal, and outputs the clock signal to the gate driving circuit 105 and the transmission circuit 107. The gate driving circuit 105 drives the switch circuit 102 based on the clock signal. The transmission circuit 107 generates a wireless transmission signal based on the clock signal, and supplies the wireless transmission signal to the transmission antenna 108. The transmission antenna 108 wirelessly transmits the wireless transmission signal to the reception antenna 205. The wireless transmission signal is transmitted from the transmission antenna 108 to the reception antenna 205 in a contactless manner. The transmission antenna 108 and the reception antenna 205 perform wireless communication by electromagnetic field coupling, optical coupling, a radio wave, or the like.

The reception antenna 205 wirelessly receives the wireless transmission signal wirelessly transmitted from the transmission antenna 108. The reception circuit 204 restores the clock signal generated by the clock generation circuit 106 based on the wireless transmission signal received by the reception antenna 205. The gate driving circuit 203 drives the rectification circuit 202 based on the clock signal. The rectification circuit 202 rectifies power wirelessly received by the power reception antenna 201, and restores a waveform of the alternating-current voltage supplied by the alternating-current power supply 401.

Each of the switch circuit 102 and the rectification circuit 202 includes a full-bridge circuit of a bidirectional switch to receive and output an alternating-current waveform including a negative voltage. The bidirectional switch is a switch that can switch between conduction and non-conduction at a timing based on the clock signal when the voltage applied to the bidirectional switch is a positive voltage or a negative voltage. For example, the bidirectional switch may be a circuit in which sources and gates of two metal oxide semiconductor field-effect transistors (MOSFETs) are connected. When a positive voltage or a negative voltage is applied between drains of the two MOSFETs, the bidirectional switch becomes conductive only at a timing when the bidirectional switch is turned on by a gate-source voltage, and becomes non-conductive at other timings. To synchronize the switch circuit 102 and the rectification circuit 202, the transmission circuit 107 transmits the clock signal as the wireless transmission signal via the transmission antenna 108.

With the above-described configuration, the switch circuit 102 and the rectification circuit 202 can switch the alternating-current voltage in synchronization with each other. This enables the rectification circuit 202 to restore the alternating-current voltage output from the alternating-current power supply 401 with high accuracy. Accordingly, the rectification circuit 202 can control the voltage applied to the motor 102 with high accuracy based on power supplied by the wireless power transmission.

A power supply voltage to operate the gate driving circuit 203 and the reception circuit 204 may be generated from the voltage applied to the motor 402 by using a buck-boost converter the like. Further, the power transmission antenna 101 and the power reception antenna 201 may be separately provided for the power supply voltage of the gate driving circuit 203 and the reception circuit 204.

The power transmission antenna 101 and the power reception antenna 201 may be formed by wiring on a printed circuit board. Further, a magnetic sheet may be bonded to the printed circuit board to reduce loss in electromagnetic field coupling and radiation of electromagnetic noise. Furthermore, each of the power transmission antenna 101 and the power reception antenna 201 may be a winding transformer using a magnetic body of ferrite or the like, and a winding of lite wire or the like.

As described above, the clock generation circuit 106 generates the clock signal. The gate driving circuit 105 drives the switch circuit 102 based on the clock signal generated by the clock generation circuit 106. The transmission circuit 107 generates the wireless transmission signal based on the clock signal generated by the clock generation circuit 106. The transmission antenna 108 wirelessly transmits the wireless transmission signal.

The reception antenna 205 wirelessly receives the wireless transmission signal wirelessly transmitted from the transmission antenna 108. The reception circuit 204 restores the clock signal based on the signal received by the reception antenna 205. The gate driving circuit 203 drives the rectification circuit 202 based on the clock signal restored by the reception circuit 204.

Each of the switch circuit 102 and the rectification circuit 202 includes the bidirectional switch. The switch circuit 102 and the rectification circuit 202 are driven based on the clock signals synchronized with each other. The clock signal for the rectification circuit 202 is the wirelessly-transmitted clock signal of the switch circuit 102.

According to the present exemplary embodiment, the control system 300 can control the alternating-current voltage applied to the motor 402 with high accuracy by synchronizing the clock signal for the switch circuit 102 and the clock signal for the rectification circuit 202.

The above-described exemplary embodiments are merely specific examples for implementation of the present disclosure, and the technical scope of the present disclosure is not limited to these exemplary embodiments. In other words, the present disclosure can be implemented in various ways without departing from the technical concept or major characteristics of the present disclosure.

It is possible to perform the wireless power transmission on the load unit and to control the alternating-current voltage applied to the load unit with high accuracy.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-111928, which was filed on Jul. 6, 2021 and which is hereby incorporated by reference herein in its entirety.

What is claimed is:

1. A control system, comprising:
   a switch circuit configured to switch an alternating-current voltage;
   a power transmission antenna configured to wirelessly transmit power based on the alternating-current voltage determined by switching of the switch circuit;
   a power reception antenna configured to wirelessly receive the power wirelessly transmitted from the power transmission antenna;
   a rectification circuit configured to rectify a voltage output from the power reception antenna to apply the alternating-current voltage to a load unit;
   a current detection unit configured to detect an alternating current flowing through the switch circuit;
   a control unit configured to control a value of the alternating-current voltage applied to the switch circuit based on a value of the alternating current detected by the current detection unit;
   a clock generation circuit configured to generate a clock signal;
   a first driving circuit configured to drive the switch circuit based on the clock signal generated by the clock generation circuit;
   a transmission circuit configured to generate a signal based on the clock signal generated by the clock generation circuit;
   a transmission antenna configured to wirelessly transmit the signal;
   a reception antenna configured to wirelessly receive the signal wirelessly transmitted from the transmission antenna;
   a reception circuit configured to restore the clock signal based on the signal received by the reception antenna; and
   a second driving circuit configured to drive the rectification circuit based on the clock signal restored by the reception circuit.

2. The control system according to claim 1, wherein the control unit controls the value of the alternating-current voltage applied to the switch circuit based on a difference between the value of the alternating current detected by the current detection unit and a target value.

3. The control system according to claim 1,
   wherein at least one of the following is movable: the power transmission antenna and the power reception antenna, and
   wherein the control unit controls the value of the alternating-current voltage applied to the switch circuit based on a relative position of the power reception antenna to the power transmission antenna and the value of the alternating current detected by the current detection unit.

4. The control system according to claim 2,
   wherein at least one of the following is movable: the power transmission antenna and the power reception antenna, and
   wherein the target value is a target value based on a sequence of movement.

5. The control system according to claim 1, wherein each of the switch circuit and the rectification circuit includes a bidirectional switch.

6. The control system according to claim 1, wherein the switch circuit and the rectification circuit are driven based on clock signals synchronized with each other.

7. The control system according to claim 6, wherein the clock signal for the rectification circuit is a wirelessly-transmitted clock signal for the switch circuit.

8. The control system according to claim 1, further comprising an alternating-current power supply configured to apply an alternating-current voltage to the switch circuit under control of the control unit.

9. The control system according to claim 1, wherein the load unit is a motor.

10. A method of controlling a control system, the method comprising:
    switching an alternating-current voltage, by a switch circuit;
    wirelessly transmitting power based on the alternating-current voltage determined by switching of the switch circuit, by a power transmission antenna;
    wirelessly receiving the power wirelessly transmitted from the power transmission antenna, by a power reception antenna;
    rectifying a voltage output from the power reception antenna to apply the alternating-current voltage to a load unit, by a rectification circuit;
    detecting an alternating current flowing through the switch circuit, by a current detection unit;
    controlling a value of the alternating-current voltage applied to the switch circuit based on a value of the alternating current detected by the current detection unit, by a control unit;
    generating a clock signal, by a clock generation circuit;
    driving the switch circuit based on the clock signal, by a first driving circuit;
    generating a signal based on the clock signal, by a transmission circuit;
    wirelessly transmitting the signal, by a transmission antenna;
    wirelessly receiving the signal wirelessly transmitted from the transmission antenna, by a reception antenna;
    restoring the clock signal based on the signal received by the reception antenna, by a reception circuit; and
    driving the rectification circuit based on the clock signal restored by the reception circuit, by a second driving circuit.

* * * * *